United States Patent
Ogawa (10) Patent No.: US 10,088,946 B2
(45) Date of Patent: Oct. 2, 2018

(54) COORDINATE DETECTION DEVICE HAVING LOOPED DRIVE LINES AND DETECTION LINES

(71) Applicant: XIROKU, INC., Ibaraki (JP)

(72) Inventor: Yasuji Ogawa, Ibaraki (JP)

(73) Assignee: XIROKU, INC., Ibaraki (JP)

( * ) Notice: Subject to any disclaimer, the term of this patent is extended or adjusted under 35 U.S.C. 154(b) by 18 days.

(21) Appl. No.: 15/309,770

(22) PCT Filed: Dec. 24, 2014

(86) PCT No.: PCT/JP2014/084060
§ 371 (c)(1),
(2) Date: Nov. 8, 2016

(87) PCT Pub. No.: WO2016/103343
PCT Pub. Date: Jun. 30, 2016

(65) Prior Publication Data
US 2017/0269770 A1    Sep. 21, 2017

(51) Int. Cl.
G06F 3/041 (2006.01)
G06F 3/044 (2006.01)
G06F 3/046 (2006.01)

(52) U.S. Cl.
CPC ............ G06F 3/0416 (2013.01); G06F 3/044 (2013.01); G06F 3/046 (2013.01);
(Continued)

(58) Field of Classification Search
CPC .................................................. G06F 3/0416
(Continued)

(56) References Cited

U.S. PATENT DOCUMENTS 5,693,914 A * 12/1997 Ogawa ................ G06F 3/03543
178/18.07
2007/0018076 A1 * 1/2007 Chen .................... G06F 3/0412
250/208.2
(Continued)

FOREIGN PATENT DOCUMENTS

JP        H08179871        7/1986
JP        2011-186550      9/2011
(Continued)

Primary Examiner — Long D Pham
(74) Attorney, Agent, or Firm — Wells St. John P.S.

(57) ABSTRACT

Provided is a coordinate detection device capable of detecting an indicator by either the electromagnetic induction type or the electrostatic capacitance type with a simple configuration and at low cost. The coordinate detection device comprises drive lines 10, detection lines 20, a drive circuit 30, a detection circuit 40, a drive line selection section 50, a detection line selection section 60 and a control section 70. The drive line selection section 50 includes a drive line loop unit 51 end a drive line connection unit 52. The detection line selection section 60 includes a detection line loop unit 61 and a detection line connection unit 62. The control section controls the drive line selection section 50 and the detection line selection section 60 so as to put the drive lines and the detection lines into the looped state when the indicator is detected by as electromagnetic induction type, and the control section controls the drive line selection section 50 and the detection line selection section 60 so as to put the drive lines and the detection lines into the opened state or so as to put the drive lines into the looped state and the detection lines into the opened state when the indicator is detected by an electrostatic capacitance type.

7 Claims, 5 Drawing Sheets

(52) U.S. Cl.
CPC .............. *G06F 2203/04104* (2013.01); *G06F 2203/04106* (2013.01); *G06F 2203/04108* (2013.01)

(58) Field of Classification Search
USPC ........................................................ 345/173
See application file for complete search history.

(56) References Cited

U.S. PATENT DOCUMENTS

| | | | |
|---|---|---|---|
| 2012/0032925 A1* | 2/2012 | Sekiya | ................ G06F 3/03545 345/175 |
| 2013/0076670 A1 | 3/2013 | Wu et al. | |
| 2014/0176486 A1 | 6/2014 | Lee et al. | |

FOREIGN PATENT DOCUMENTS

| | | |
|---|---|---|
| JP | 2013-069270 | 4/2013 |
| JP | 2014-127201 | 7/2014 |

* cited by examiner

COORDINATE DETECTION DEVICE HAVING LOOPED DRIVE LINES AND DETECTION LINES

CROSS REFERENCE TO RELATED APPLICATION

This is a 35 U.S.C. § 371 application of, and claims priority to, International Application No. PCT/JP2014/084060, which was filed on Dec. 24, 2014, and the teachings of the application are incorporated herein by reference.

TECHNICAL FIELD

The present invention relates to a coordinate detection device, and more particularly to a coordinate detection device capable of detecting an indicator by either an electromagnetic induction type or an electrostatic capacitance type.

BACKGROUND ART

In a coordinate input device that detects an input made by a user's hand or finger, an electrostatic capacitance type, which is capable of detecting simultaneous inputs made by a plurality of indicators, that is, easily detecting multi-touch events, is currently mainstream. The electrostatic capacitance type coordinate input device detects an input position by utilizing a minute change in electrostatic capacitance, so that detection resolution is not high, and thus the detection accuracy of an input coordinate is low. Thus, coordinate input devices of an electromagnetic induction type having higher detection accuracy are used for character writing or picture drawing. In the electromagnetic induction type coordinate input devices, a coil is embedded into an indicator, and an induced electromotive force from the coil driven by a drive line provided in a detection surface is detected by a detection line, whereby an indicated position is detected.

For example, Patent Document 1 discloses a coordinate detection device capable of detecting an indicator by either the electromagnetic induction type or electrostatic capacitance type. This device is realized by laminating an electromagnetic induction type pen detection unit and an electrostatic capacitance type finger detection unit with a display device interposed therebetween.

Further, Patent Document 2 discloses a device capable of detecting a position of an oscillating pen as a digitizer as well as detecting a position of a finger as a touch panel. When operating as the digitizer, the device oscillates a predetermined carrier signal from the oscillating pen and detects the carrier signal from individual electrode lines. When operating as the touch panel, the device provides a carrier signal similar to the carrier signal from the oscillating pen to an arbitrary electrode line. Then, an electric field occurs between orthogonal electrode lines by capacitive coupling. When a finger approaches the touch panel, a signal from the electric field is absorbed by the finger to cause a capacitance change. This capacitance change is utilized to detect the finger.

CITATION LIST

Patent Document

Patent Document 1: Japanese Patent Application Kokai Publication No. 2011-188550

Patent Document 2: Japanese Patent Application Kokai Publication No. Hei 08-179871

DISCLOSURE OF THE INVENTION

Problems to be Solved by the Invention

In the device of Patent Document 1, detection units of two different types are provided, resulting in an increase in cost and an increase in size and weight. Further, when a distance between a surface to be detected and the detection unit becomes large, an actual input position and a detected position may be misaligned.

Further, in the device of Patent Document 2, when the device is used as a digitizer, an oscillation pen that oscillates a predetermined carrier signal needs to be used as an indicator. That is, a power supply such as a battery needs to be provided in the indicator. Since this device can detect only the electrostatic capacitance, it cannot detect an electromagnetic induction type pen.

An object of the present invention, therefore, is to overcome the problems existing in the prior art, and to provide a coordinate detection device capable of detecting an indicator by either the electromagnetic induction type or the electrostatic capacitance type with a simple configuration and at low cost.

Means for Solving the Problems

According to one aspect of the invention, there is provided a coordinate detection device may include: a plurality of drive lines that aye arranged in parallel along one of X- and Y-coordinate axes; a plurality of detection lines that are arranged in parallel along the other one of the X- and Y-coordinate axes; a drive circuit that is connected to one ends of the drive lines and inputs a predetermined drive voltage to the drive lines to drive the drive lines; a detection circuit that is connected to one ends of the detection lines, detects a signal from the detection lines, and calculates indicated position coordinates of the indicator; a drive line selection section that includes a drive line loop unit that is connected to the other ends of the drive lines and functions so as to selectively put two drive lines into a looped state from an opened state and a drive Line connection unit that is connected to the drive circuit so as to allow a current to flow in the looped drive line; a detection line selection section that includes a detection line loop unit that is connected to the other ends of the detection lines and functions so as to selectively put two detection lines into a looped state from an opened state and a detection line connection unit that is connected to the detection circuit so as to detect a current flowing in the looped detection line or a potential difference; and a control section that controls the drive line selection section and the detection line selection section so as to sequentially connect a predetermined drive line and a predetermined detection line to the drive circuit and the detection circuit, respectively, the control section controlling the drive line selection section and the detection line selection section so as to put the drive lines and the detection lines into the looped state when the indicator is detected by an electromagnetic induction type, and the control section controlling the drive line selection section and the detection line selection section so as to put the drive lines and the detection lines into the opened state or so as to put the drive lines into the looped state and the detection lines into the opened state when the indicator is detected by an electrostatic capacitance type.

The drive line loop unit of the drive line selection section may function so as to put an odd-numbered drive line and an even-numbered drive line into a looped state with a predetermined number of drive lines interposed therebetween, and the detection line loop unit of the detection line selection section may function so as to put an odd-numbered detection line and an even-numbered detection line into a looped state with a predetermined number of detection lines interposed therebetween.

The drive line loop unit of the drive line selection section and/or the detection line loop unit of the detection line selection section may be any one of a resistor element, a capacitor, a coil, a diode, and an analog switch, or a combination thereof.

The detection line loop unit of the detection line selection section may include a diode, the coordinate detection device may further include a detection line bias unit that brings the detection line to a predetermined bias potential, and the control section may also control the detection line bias unit.

The drive line loop unit of the drive line selection section may include a diode, the coordinate detection device may further include a drive line bias unit that brings the drive line to a predetermined bias potential, and the control section may also control the drive line bias unit.

The control section may also control a drive voltage of the drive circuit.

The coordinate detection device may further include a sheet base material, wherein the drive lines and/or the detection lines may be arranged on the sheet base material, and the drive line loop unit and/or the detection line loop unit may be installed on the sheet base material.

Further, a coordinate detection device may include; a plurality of drive lines that are arranged in parallel along one of X- and Y-coordinate axes; a plurality of detection lines that are arranged in parallel along the other one of the X- and Y-coordinate axes; a drive circuit that is connected to one ends of the drive lines and inputs a predetermined drive voltage to the drive lines to drive the drive lines; a detection circuit that is connected to one ends of the detection lines, detects a signal from the detection lines, identifies the indicator based on increase/decrease in a level of the detected signal, and calculates indicated position coordinates of the indicator; a drive line selection section that includes a drive line loop unit that is connected to the other ends of the drive lines to foe interposed between two drive lines so as to selectively put the two drive lines into a looped state and has a higher resistance value than the drive lines and a drive line connection unit that is connected to the drive circuit so as to allow a current to flow in the looped drive line; a detection line selection section that includes a detection line loop unit that is connected to the other ends of the detection lines to be interposed between two detection lines so as to selectively put the two detection lines into a looped state and has a higher resistance value than the detection lines and a detection line connection unit that is connected to the detection circuit so as to detect a current flowing in the looped detection line or a potential difference; and a control section that controls the drive line selection section and the detection line selection section so as to sequentially connect a predetermined drive line and a predetermined detection line to the drive circuit and the detection circuit, respectively.

Furthermore, a coordinate detection device may include: a plurality of drive lines that are arranged in parallel along one of X- and Y-coordinate axes; a plurality of detection lines that are arranged in parallel along the other one of the X- and Y-coordinate axes; a drive circuit that is connected to one ends of the drive lines and inputs a predetermined drive voltage to the drive lines to drive the drive lines; a detection circuit that is connected to one ends of the detection lines, detects a signal from the detection lines, and calculates indicated position coordinates of the indicator; a drive line selection section that includes a drive line GND potential connection unit that is connected to the other ends of the drive lines and functions so as to selectively connect the drive lines to a GND potential and a drive line connection unit that is connected to the drive circuit so as to allow a current to flow in the drive line; a detection line selection section that includes a detection line GND connection unit that is connected to the other ends of the detection lines and functions so as to selectively connect the detection lines to the GND potential and a detection line connection unit that is connected to the detection circuit so as to detect a current flowing in the detection line or a potential difference; and a control section that controls the drive line selection section and the detection line selection section so as to sequentially connect a predetermined drive line and a predetermined detection line to the drive circuit and the detection circuit, respectively, the control motion controlling the drive line selection section and the detection line selection section so as to connect the drive lines and the detection lines to the GND potential when the indicator is detected by an electromagnetic induction type, and the control section controlling the drive line selection section and the detection line selection section so as to put the drive lines and the detection lines into the opened state or so as to connect the drive lines to the GND potential and the detection lines into the opened state when the indicator is detected by an electrostatic capacitance type.

Advantages of the Invention

The coordinate detection device according to the present invention has an advantage in that it can detect an indicator by either the electromagnetic induction type or the electrostatic capacitance type with a simple configuration and at low cost.

BEST MODE FOR CARRYING OUT THE INVENTION

Figure 1:
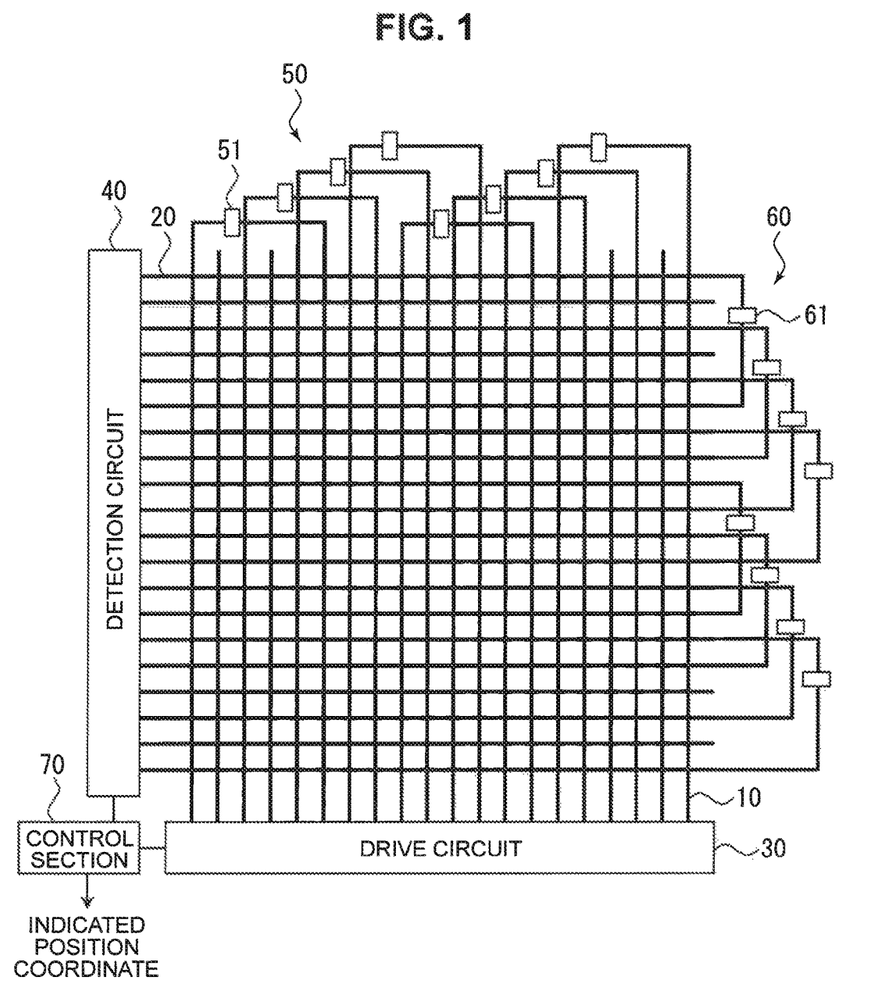
FIG. 1 is a schematic block diagram for explaining a coordinate detection device according to the present invention.
Figure 2:
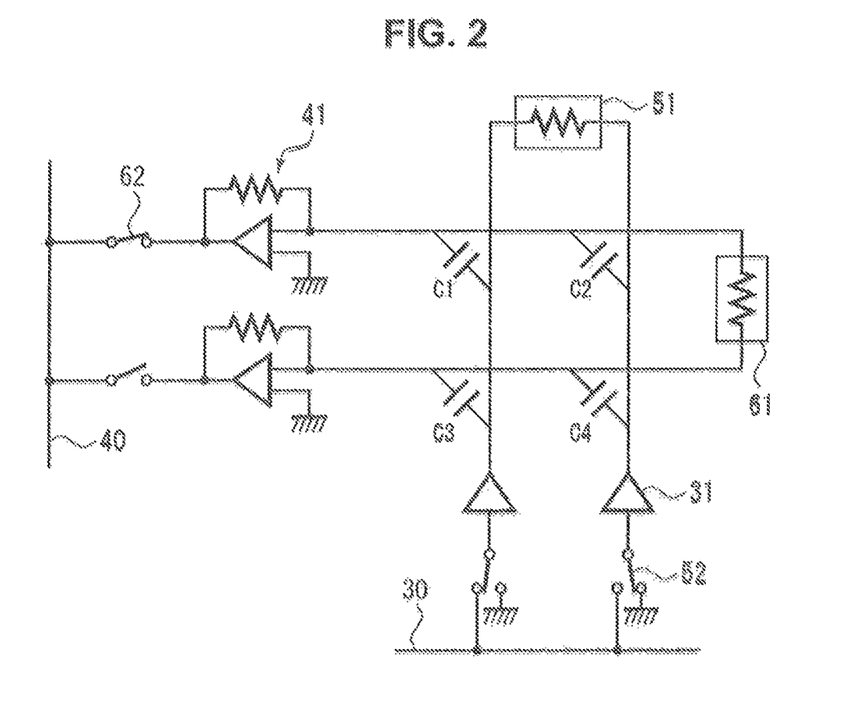
FIG. 2 is a schematic circuit diagram for explaining a more specific configuration of the coordinate detection device according to the present invention.

Preferred embodiments of the present invention will be described below with reference to the accompanying drawings. FIG. 1 is a schematic block diagram for explaining a coordinate detection device according to the present invention. As illustrated, the coordinate detection device of the present invention mainly includes drive lines 10, detection lines 20, a drive circuit 30, a detection circuit 40, a drive line selection section 80, a detection line selection section 60, and a control section 70. FIG. 2 is a schematic circuit diagram for explaining a more specific configuration of the coordinate detection device according to the present invention.

The drive lines 10 are arranged in parallel along one of X- and Y-coordinate axes, for example, in the illustrated example, along the Y-coordinate axis. The drive lines 10 may each be formed of a conducting member such as a copper wire or a line pattern.

The detection lines 20 are arranged in parallel along one of the X- and Y-coordinate axes, for example, in the illustrated example, along the X-coordinate axis. The detection lines 20 may each also be formed of a conducting member such as a copper wire or a line pattern.

The drive lines 10 and the detection lines 20 may each be arranged on a substrate so as to be insulated from each other. Alternatively, they may be arranged on a sheet base material having flexibility such as a flexible substrate.

The drive circuit 30 is connected to one ends of the respective drive lines 10 and inputs a predetermined drive voltage to drive the drive lines 10. In the illustrated example, the drive circuit 30 is connected to the lower ends of the respective drive lines 10. The predetermined drive voltage is, for example, an output signal of a predetermined frequency from an oscillator. The drive circuit 30 includes, for example, a drive amplifier and amplifies a signal from the oscillator to supply the amplified signal to the drive lines 10.

The detection circuit 40 is connected to one ends of the respective detection lines 20 and detects a signal from the detection lines 20. In the illustrated example, the detection circuit 40 is connected to the left ends of the respective detection lines 20. The signal from the detection lines 20 is a current flowing based on electromagnetic coupling or electrostatic coupling. The detection circuit 40 includes an amplifier circuit such as an operational amplifier and measures the current flowing in the detection lines 20 or a potential difference.

The drive line selection section 50 includes a drive line loop unit 51 and a drive line connection unit 52. The drive line loop unit 51 is connected to the other ends of several drive lines 10 and functions go as to selectively put two drive lines 10 into a looped state from an opened state. The drive line connection unit 52 connects the drive circuit to the drive line so as to allow a current to flow in the looped drive line 10. In the example of FIG. 1, the drive line loop unit 51 is connected to an even-numbered drive line 10 and an odd-numbered drive line 10 with a predetermined number of drive lines interposed therebetween so as to put the two drive lines 10 into a loop state. More specifically, the two drive lines 10 are connected to each other through the drive line loop unit 51 with four drive lines 10 interposed therebetween. However, the present invention is not limited to this, but any configuration may be adopted as long as the two drive lines 10 are connected to each other through the drive line loop unit 51. The drive line connection unit 52 sequentially connects a drive voltage supplied from the drive circuit 30 to one drive line 10 to another.

The detection line selection section 60 includes a detection line loop unit 61 and a detection line connection unit 62. The detection line loop unit 61 is connected to the other ends of several detection lines 20 and functions so as to selectively put two detection lines 20 into a looped state from an opened state. The detection line connection unit 62 connects the detection line to the detection circuit 40 so as to allow a current flowing in the looped detection line 20 or a potential difference to be detected. In the example of FIG. 1, the detection line loop unit 61 is connected to an odd-numbered detection line 20 and an even-numbered detection line 20 with a predetermined number of detection lines interposed therebetween so as to put the two detection lines 20 into a loop state. More specifically, the two detection lines 20 are connected to each other through the detection line loop unit 61 with tour detection lines 20 interposed therebetween. However, the present invention is not limited to this, and any configuration may be adopted as long as the two detection lines 20 are connected to each other through the detection line loop unit 61. The detection line connection unit 62 connects the current flowing in the detection lines 20 or potential difference to the detection circuit 40 while sequentially switching the detection lines 20.

The control section 70 controls the drive line selection section 50 and the detection line selection section 60 so as to sequentially connect predetermined drive lines 10 and the detection lines 20 to the drive circuit 30 and the detection circuit 40, respectively. When detecting an indicator using an electromagnetic induction type, the control section 70 controls the drive line selection section 50 and the detection line selection section 60 so as to put the drive lines 10 and the detection lines 20 into the looped state. On the other hand, when detecting an indicator using an electrostatic capacitance type, the control section 70 controls the drive line selection section 50 and the detection line selection section 60 so as to put the drive lines 10 and the detection lines 20 into the opened state. The control section 70 may control the drive line selection section 50 and the detection line selection section 60 so as to put the drive lines 10 into the looped state and put the detection lines 20 into the opened state.

More detailed description will be made using FIG. 2. As illustrated in FIG. 2, in this example, the drive line loop unit 51 and the detection line loop unit 61 are each a resistor element. The drive circuit 30 includes a drive amplifier 31 for amplifying a drive voltage. The detection circuit 40 includes an operational amplifier 41 for amplifying a detection signal. The drive line loop unit 51 and the detection line loop unit 61 are used to put the drive lines 10 and the detection lines 20 into the looped state such that a current flows in the drive lines 10 and the detection lines 20 so as to electromagnetically couple the drive lines 10 and the detection lines 20. In this example, the drive line 10 or the detection line 20 has a low resistance value, and the resistor element as the loop unit has a higher resistance value than the drive line 10 or the detection line 20. The drive line connection unit 52 is provided for connecting the drive circuit 30 so as to allow a current to flow in the looped drive line 10. Similarly, the detection line connection unit 62 is provided for connecting the detection line to the detection circuit 40 so as to allow a current flowing in the looped detection line 20 or a potential difference to be detected. The control section 70 controls the drive line selection section 50 and the detection line selection section 60 such that the predetermined drive lines 10 and the detection lines 20 are sequentially selected and connected to the drive circuit 30 and the detection circuit 40, respectively. That is, when the resistance value of the drive line 10 is low, the drive line loop unit 51 is put into the opened state by the resistance of the resistor element of the drive line loop unit 51, allowing all the drive lines other than the selected drive lines 10 to be maintained at a GND potential. Similarly, when the resistance value of the detection line 20 is low, the detection line loop unit 61 is put into the opened state by the resistance of the resistor element of the detection line loop unit 61, allowing all the detection lines other than the selected detection lines 20 to be maintained in the opened state. That is, in FIG. 2, the drive voltage from the drive line 10 connected to the drive circuit 30 flows in the detection line 20 through an electrostatic coupling capacitor C1. Then, the drive voltage signal is detected from the detection line 20 connected to the detection circuit 40. At this time, an input side of the operational amplifier 41 is set to the GND potential in terms of both a direct current and an alternate current, so that it is possible to detect only the current flowing therein, thereby allowing the current or potential difference from the C1 to be detected independently of the other electrostatic coupling capacitors C2, C3, and C4. When the resistance value of the drive line or the detection line is high, it is difficult to maintain the potential of unselected drive lines at the GND potential, resulting in mixing of a current flowing from, e.g., C2. Further, a current flowing in C3 or C4 is mixed through unselected detection lines and the detection line loop unit. Thus, in this example, the resistance value of the drive line or the detection line should be sufficiently lower than that of the drive line loop unit or the detection line loop unit.

Figure 3:
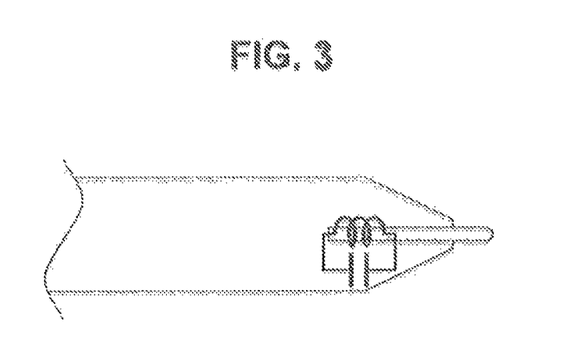
FIG. 3 is a schematic diagram for explaining an example of an electromagnetic induction type pen having a capacitor and a coil.

In the example of FIG. 2, the control section 70 uses the drive line connection unit 52 for connecting the drive circuit 80 to the drive line 10 so as to allow a current to flow in the selected looped drive line 10 and for fixing the unselected drive line 10 at the GND potential. Further, the control section 70 uses the detection line connection unit 62 for connecting the selected detection line 20 to the detection circuit 40 and for fixing the unselected detection line 20 at the GND potential. By sequentially connecting the drive lines 10 and the detection lines 20 to the drive circuit 30 and the detection circuit 40, respectively, it is possible to identify an intersection from which, a signal is detected based on a combination of the selected drive line and the detection line. Utilizing this, indicated position coordinates of an indicator are detected. An indicator that can be detected by the thus configured coordinate detection device will be described using FIG. 3. FIG. 3 is a schematic view for explaining m example of an electromagnetic induction type pen having a capacitor and a coil. As illustrated, the electromagnetic induction type pen includes a resonance circuit having a capacitor and a coil. In the illustrated example, the coil is wound around a ferrite core, and the ferrite core serves as a pen tip. When input coordinates of such an electromagnetic induction type pen are detected (i.e., electromagnetic induction type), the detection and drive lines controlled as described above are each put into the looped state, and a current flows therein. When the electromagnetic induction type pen approaches the drive line or the detection line, it is electromagnetically coupled to the drive line and the detection line, with the result that a degree of electromagnetic coupling between the drive and detection lines orthogonal to each other becomes high. Accordingly, a signal to be detected by the detection circuit 40 is increased in level. On the other hand, when input coordinates of e.g., a finger are detected as an indicator (i.e., electrostatic capacitance type), the resistor element is used to realize the opened state as illustrated in the example of FIG. 2. When a touch operation is made by the finger, electrostatic coupling is reduced and, accordingly a signal to be detected by the detection circuit 40 is reduced in level. As described above, the detection circuit 40 can calculate the indicated position coordinates of an indicator and can identify the indicator based on increase/decrease in the level of a signal to be detected. That is, it is possible to identify whether the indicator is the electromagnetic induction type pen or finger.

As described above, the coordinate detection device according to the present invention can detect an indicator such as the electromagnetic induction type pen or the finger in either the electromagnetic induction type or the electrostatic capacitance type with a simple configuration and at low cost. Further, by making resonance frequencies and phases of a plurality of electromagnetic induction type pens different from each other, a frequency and a phase to be detected vary which allows for identification of individual pens. Further, based on the phase detection, it is possible to realize additional, functions such as stroke pressure detection and switching.

Although the resistor element is used as the drive line loop unit or the detection line loop unit in the above illustrated example, the present invention is not limited to this. For example, when the drive voltage of the drive circuit is an AC signal, a coil or a capacitor may be used as the impedance element like the resistor element.

Figure 4A:
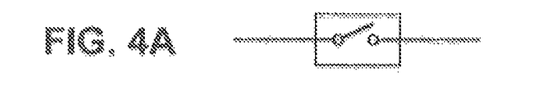
FIGS. 4A to 4D are schematic circuit diagrams for explaining another example of the drive line loop unit and the detection line loop unit of the coordinate detection device according to the present invention.

FIGS. 4A to 4D are schematic circuit diagrams for explaining another example of the drive line loop unit and the detection line loop unit. As illustrated in FIG. 4A, an analog switch can be used as the drive line loop unit and the detection line loop unit. This is effective when the resistance value of the drive line 10 or the detection line 20 is high. In the electrostatic capacitance type, by opening the analog switch, it is possible to reliably put the unselected drive lines 10 into the opened state. Similarly, in the electromagnetic induction type, by closing the analog switch, it is possible to reliably maintain the unselected detection lines 20 at the GND potential. When an indicator is detected using the electromagnetic induction type, the control section 70 puts the analog switch into an ON state during a time slot for detection of the electromagnetic induction type pen.

As described above, when an indicator is detected by the electromagnetic induction type, the drive line loop unit and the detection line loop unit are on-controlled so as to put the drive lines and the detection lines into the looped state. On the other hand, when an indicator is detected by the electrostatic capacitance type, the drive line loop unit and the detection line loop unit are off-controlled so as to put the drive lines and the detection lines into the opened state.

Figure 4B:
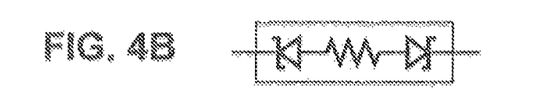

Alternatively, a diode can be used as the drive line loop unit and the detection line loop unit. For example, as illustrated in FIG. 4B, a zener diode can be used. Specifically, anodes of the zener diodes are connected through a resistor element. By utilizing a reverse voltage of the zener diode, it is possible to eliminate an induced current to the unselected drive and detection lines.

Figure 4C:
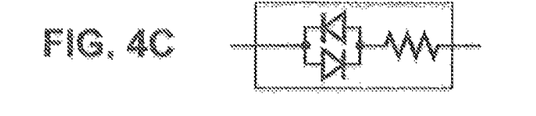

Alternatively, as illustrated in FIG. 4C, a silicon diode can be used as the drive line loop unit and/or the detection line loop unit. Specifically, a resistor element is serially connected to silicon diodes connected parallelly in reverse directions. By utilizing a forward voltage of the silicon diode, it is possible to eliminate an induced current to unselected drive and detection lines 10 and 20 as in the case of the above-mentioned zener diode.

Figure 4D:
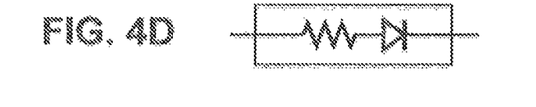

Alternatively, as illustrated in FIG. 4D, a circuit obtained by connecting in series a silicon diode and a resistor element, can be used as the drive line loop unit and/or the detection line loop unit. In the coordinate detection device according to the present invention, any one of the resistor element, capacitor, coil, diode, and analog switch, or a combination thereof can be used as the drive line loop unit and the detection line loop unit.

Figure 5:
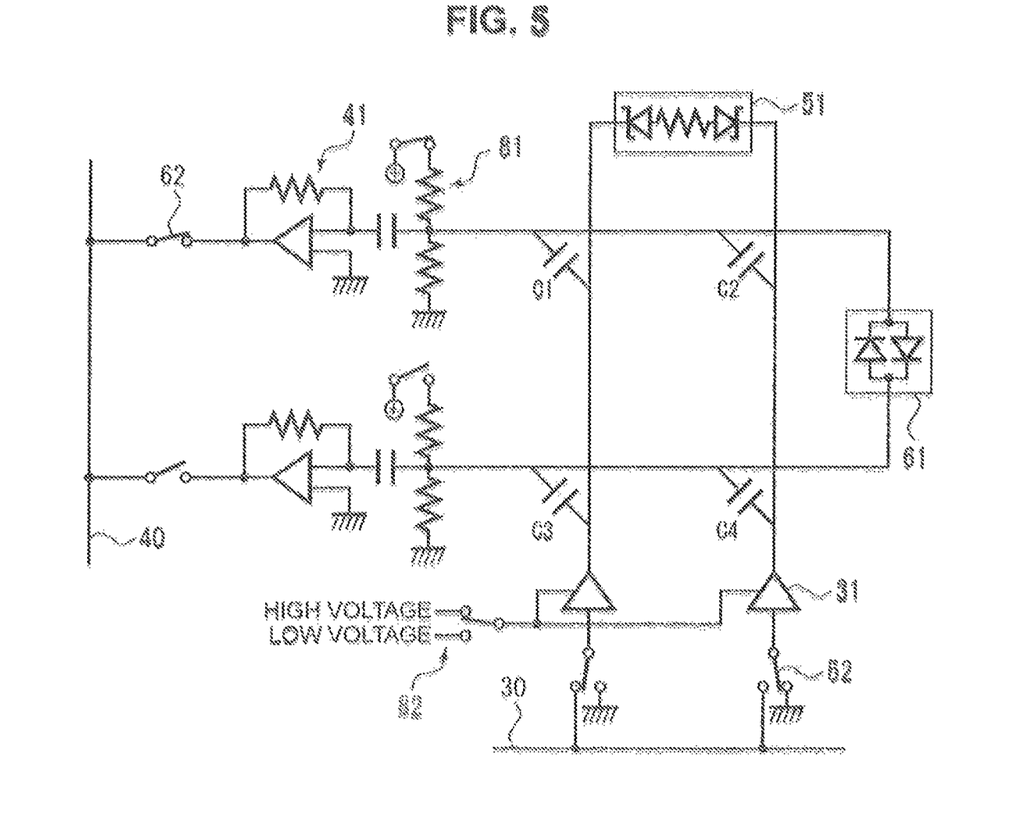
FIG. 5 is a schematic circuit diagram for explaining another example of the coordinate detection device according to the present invention.

Here, a coordinate detection device according to the present invention using the drive line loop unit and the detection line loop unit illustrated in FIGS. 4B and 4C will be described more specifically using FIG. 5. FIG. 5 is a schematic circuit diagram for explaining another example of the coordinate detection device according to the present invention. In FIG. 5, the same reference numerals are given to the same components as in FIG. 2. As illustrated, in this example, the zener diode illustrated in FIG. 4B is used as the drive line loop unit, and the silicon diode illustrated in FIG. 4C is used as the detection line loop unit. In a common silicon diode, an AC impedance becomes high when a voltage at both ends of the diode is equal to or lower than 0.6 V and becomes low when equal to or higher than 0.8 V. The loop on/off control can be realized by utilizing this phenomenon. That is, a detection line bias unit 81 that brings the detection line 20 to a predetermined bias potential is provided. The detection line bias unit 81 can be on/off controlled by the control section 70 so as to be brought to a predetermined potential. When the detection line loop unit 61 realized by use of the silicon diode needs to be turned off, that is, when an indicator is detected by the electrostatic capacitance type, the detection line bias unit 81 is turned off to bring the DC bias voltage to equal to or lower than 0.6 V, whereby the impedance of the detection line loop unit 61 is increased to put the detection line loop unit 61 into an opened state. On the other hand, when an indicator is detected by the electromagnetic induction type, the detection line bias unit 81 is turned on to bring the DC bias voltage to be equal to or higher than 0.8 V, whereby the impedance of the detection line loop unit 61 is reduced to put the detection line loop unit 61 into a conductive state.

Similarly, a drive line bias unit 82 that brings the drive line 10 to a predetermined bias potential is provided. The drive line bias unit 82 can control the drive voltage level to be output from the drive amplifier 31 under the control of the control section 70. When an indicator is detected by the electrostatic capacitance type, the drive voltage from the drive amplifier 31 is reduced to turn off the drive line loop unit 51, whereby the drive lines 10 in the opened state are selected. On the other hand, when an indicator is detected by the electromagnetic induction type, the drive voltage from the drive amplifier 31 is increased to turn on the drive line loop unit 51 to put the same into a conductive state. The same on/off control can be realized by controlling the drive voltage itself of the drive circuit 30 using the control section 70.

Figure 6:
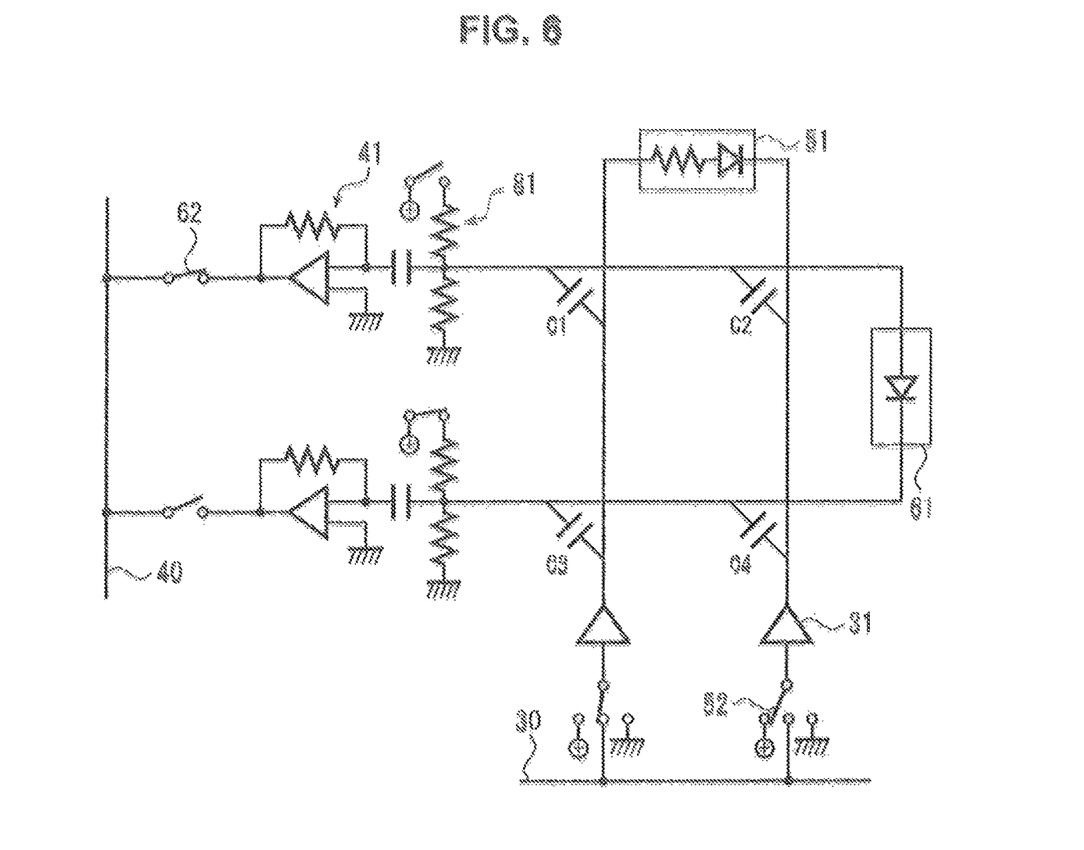
FIG. 6 is a schematic circuit diagram for explaining still another example of the coordinate detection device according to the present invention.

Next, a coordinate detection device according to the present invention using the drive line loop unit and the detection line loop unit illustrated in FIG. 4D will be described more specifically by use of FIG. 6. FIG. 6 is a schematic circuit diagram for explaining still another example of the coordinate detection device according to the present invention. In FIG. 6, the same reference numerals are given to the same components as in FIG. 2. As illustrated, in this example, a circuit using the silicone diode illustrated in FIG. 4D is used as the drive line loop unit and the detection line loop unit. In this example, when the drive line loop unit 51 is turned off, the drive line connection unit 52 is connected to the drive circuit 30 and switches the unselected drive line 10 connected through the drive line loop unit 51 to a plus potential. As a result, a reverse voltage is applied to the diode constituting the drive line loop unit 51 to put the drive line loop unit 51 into an opened state. On the other hand, when the drive line loop unit 51 is turned on, the drive line connection unit 52 is connected to the drive circuit 30 and switches the drive line 10 connected through the drive line loop unit 51 to the GND potential. As a result, a forward voltage is applied to the diode constituting the drive line loop unit 51 to put the drive line loop unit 51 into a conductive state.

Similarly, when the detection line loop unit 61 is turned off, the detection line bias unit 81 that brings the selected detection line 20 to a predetermined bias voltage is turned off, and a bias potential of the unselected detection line 20 connected through the detection line loop unit 61 is turned on by use of the detection line bias unit 81. As a result, a reverse voltage is applied to the diode constituting the detection line loop unit 81 to put the detection line loop unit 61 into an opened state. On the other hand, when the detection line loop unit 61 is turned on, the detection line bias unit 81 that brings the selected detection line 20 to a predetermined bias voltage is turned on, and the bias potential of the unselected detection line 20 connected through the detection line loop unit 61 is turned off. As a result, a forward voltage is applied to the diode constituting the detection line loop unit 61 to put the detection line loop unit 61 into a conductive state.

As described above, also in this example, when an indicator is detected by the electromagnetic induction type, the drive line loop unit and the detection line loop unit are on-controlled so as to put the drive lines and the detection lines into the looped state. On the other hand, when an indicator is detected by the electrostatic capacitance type, the drive line loop unit and the detection line loop unit are off-controlled so as to put the drive lines and the detection lines into the opened state. As a result, it is possible to detect the indicator through both the electromagnetic induction type pen and finger.

Figure 7:
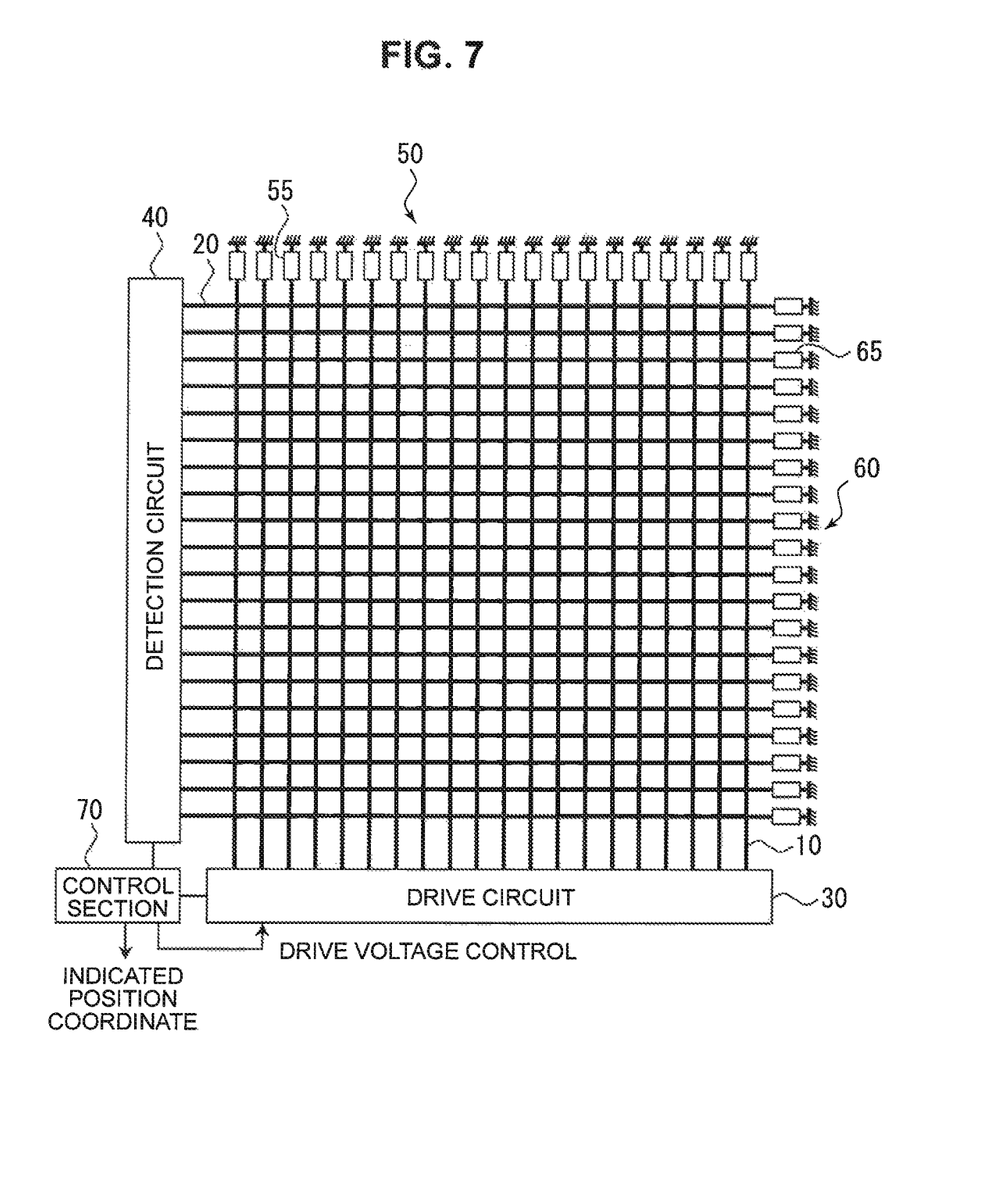
FIG. 7 is a schematic block diagram for explaining still another example of the coordinate detection device according to the present invention.

Next, a still another example of the coordinate detection device according to the present invention will be described with reference to FIG. 7. FIG. 7 is a schematic block diagram for explaining a still another example of the coordinate detection device according to the present invention. In FIG. 7, the same reference numerals are given to the same components as in FIG. 1. As illustrated, in this example, in place of the drive line loop unit and the detection line loop unit, there are provided a drive line GND potential connection unit and a detection line GND potential connection unit that connect the other ends of the respective drive and detection lines to the GND potential. That is, in the examples described above, the drive line is connected in a looped state to the GND potential through another drive line; on the other hand, in the illustrated example, one ends of the drive line and the detection line are connected to the drive circuit 30 and the detection circuit 40, respectively, and the other ends thereof are connected to a common GND through a drive line GND potential connection unit 55 and a detection line GND potential connection unit 65, respectively, so as to allow a current to flow in the drive and detection lines 10 and 20. When an indicator is detected by the electromagnetic induction type, the control section 70 controls the drive line selection section 50 and the detection line selection section 60 so as to connect the drive and detection lines to the GND potential. When an indicator is detected by the electrostatic capacitance type, the control section 70 controls the drive line selection section and the detection line selection section so as to put the drive and detection lines 10 and 20 into the opened state or so as to connect the drive lines 10 to the GND potential and to put the detection lines 20 into the opened state. The drive line GND potential connection unit 55 and the detection line GND potential connection unit 65 may each be any one of the resistor element, capacitor, coil, diode, and analog switch, or a combination thereof.

Even in this configuration, as in the examples described above, when an indicator (electromagnetic induction type pen) is detected by the electromagnetic induction type, a current flows in the drive and detection lines 10 and 20, and the detection circuit 40 can detect that the electromagnetic coupling degree becomes high. When an indicator (finger) is detected by the electrostatic capacitance type, the electrostatic coupling is weakened and, accordingly, a signal to be detected by the detection circuit 40 is reduced in level, whereby an indicated position of the finger can be detected.

Further, when an indicator is detected by the electromagnetic induction type, by controlling the drive voltage of the drive circuit 30, it is possible to lower the drive voltage to thereby reduce current consumption. That is, in the electrostatic capacitance type, the drive and detection lines are connected to the GND potential to allow a current to flow therein. Thus, by lowering the drive voltage to a certain extent, low power consumption can be achieved.

The drive and detection lines may each be provided on a sheet base material having flexibility such as a flexible substrate. More specifically, for example, a pattern of the drive line and that of the detection line are printed on sheet base materials, respectively, using conductive ink. Then, the sheet base materials are overlapped such that the drive lines and the detection lines cross at right angles, whereby a detection surface can be formed easily. Further, the drive line loop unit and the detection line loop unit may each be formed on a sheet base material. For example, when the drive line loop unit and the detection line loop unit are each a resistor element, a resistor element pattern is printed on the sheet base material using conductive ink. With this configuration, it is possible to manufacture a coordinate detection device capable of detecting an indicator by either the electromagnetic induction type or electrostatic capacitance type with a simple configuration and at low cost.

The coordinate detecting device according to the present invention is not limited to the above illustrated example, but various modifications may be made without departing from the scope of the present invention.

REFERENCE SIGNS LIST

10: Drive line
20: Detection line
30: Drive circuit
31: Drive amplifier
40: Detection circuit
41: Operational amplifier
50: Drive line selection section
51: Drive line loop unit
52: Drive line connection unit
55: Drive line GND potential connection unit
60: Detection line selection section
61: Detection line loop unit
62: Detection line connection unit
65: Detection line GND potential connection unit
70: Control section
81: Detection line bias unit
82: Drive line bias unit

The invention claimed is:

1. A coordinate detection device that detects an indicated position coordinate of an indicator, comprising:
a plurality of drive lines that are arranged in parallel along one of X- and Y-coordinate axes;
a plurality of detection lines that are arranged in parallel along the other one of the X- and Y-coordinate axes;
a drive circuit that is connected to one ends of the drive lines and inputs a predetermined drive voltage to the drive lines to drive the drive lines;
a detection circuit that is connected to one ends of the detection lines, detects a signal from the detection lines, and calculates indicated position coordinates of the indicator;
a drive line selection section that includes a drive line loop unit that includes a diode connected to the other ends of the drive lines and a drive line bias unit bringing the drive line to a predetermined bias potential and functions so as to selectively put two drive lines into a looped state from an opened state and a drive line connection unit that is connected to the drive circuit so as to allow a current to flow in the looped drive line;
a detection line selection section that includes a detection line loop unit that includes a diode connected to the other ends of the detection lines and a detection line bias unit bringing the detection line to a predetermined bias potential and functions so as to selectively put two detection lines into a looped state from an opened state and a detection line connection unit that is connected to the detection circuit so as to detect a current flowing in the looped detection line or a potential difference; and
a control section that controls the drive line selection section and the detection line selection section so as to sequentially connect a predetermined drive line and a predetermined detection line to the drive circuit and the detection circuit, respectively, the control section controlling the drive line bias unit and the drive line selection section as well as the detection line bias unit and the detection line selection section so as to put the drive lines and the detection lines into the looped state when the indicator is detected by an electromagnetic induction type, and the control section controlling the drive line bias unit and the drive line selection section as well as the detection line bias unit and the detection line selection section so as to put the drive lines and the detection lines into the opened state or so as to put the drive lines into the looped state and the detection lines into the opened state when the indicator is detected by an electrostatic capacitance type.

2. The coordinate detection device according to claim 1, wherein
the drive line loop unit of the drive line selection section functions so as to put into a looped state by connecting the diode between an odd-numbered drive line and an even-numbered drive line with a predetermined number of drive lines interposed therebetween, and
the detection line loop unit of the detection line selection section functions so as to put into a looped state by connecting the diode between an odd-numbered detection line and an even-numbered detection line with a predetermined number of detection lines interposed therebetween.

3. The coordinate detection device according to claim 2, wherein
the control section also controls a drive voltage of the drive circuit.

4. The coordinate detection device according to claim 2, which further comprises a sheet base material, wherein
the drive lines and/or the detection lines are arranged on the sheet base material, and
the drive line loop unit and/or the detection line loop unit are/is installed on the sheet base material.

5. The coordinate detection device according to claim 1, wherein
the control section also controls a drive voltage of the drive circuit.

6. The coordinate detection device according claim 5, which further comprises a sheet base material, wherein
the drive lines and/or the detection lines are arranged on the sheet base material, and
the drive line loop unit and/or the detection line loop unit are/is installed on the sheet base material.

7. The coordinate detection device according to claim 1, which further comprises a sheet base material, wherein
the drive lines and/or the detection lines are arranged on the sheet base material, and
the drive line loop unit and/or the detection line loop unit are/is installed on the sheet base material.

* * * * *

UNITED STATES PATENT AND TRADEMARK OFFICE
CERTIFICATE OF CORRECTION

PATENT NO. : 10,088,946 B2
APPLICATION NO. : 15/309770
DATED : October 2, 2018
INVENTOR(S) : Yasuji Ogawa It is certified that error appears in the above-identified patent and that said Letters Patent is hereby corrected as shown below:

On the Title Page (57) ABSTRACT - Replace "Provided is a coordinate detection device capable of detecting an indicator by either the electromagnetic induction type or the electrostatic capacitance type with a simple configuration and at low cost. The coordinate detection device comprises drive lines 10, detection lines 20, a drive circuit 30, a detection circuit 40, a drive line selection section 50, a detection line selection section 60 and a control section 70. The drive line selection section 50 includes a drive line loop unit 51 end a drive line connection unit 52. The detection line selection section 60 includes a detection line loop unit 61 and a detection line connection unit 62. The control section controls the drive line selection section 50 and the detection line selection section 60 so as to put the drive lines and the detection lines into the looped state when the indicator is detected by as electromagnetic induction type, and the control section controls the drive line selection section 50 and the detection line selection section 60 so as to put the drive lines and the detection lines into the opened state or so as to put the drive lines into the looped state and the detection lines into the opened state when the indicator is detected by an electrostatic capacitance type."
With --Provided is a coordinate detection device capable of detecting an indicator by either the electromagnetic induction type or the electrostatic capacitance type with a simple configuration and at low cost. The coordinate detection device comprises drive lines 10, detection lines 20, a drive circuit 30, a detection circuit 40, a drive line selection section 50, a detection line selection section 60 and a control section 70. The drive line selection section 50 includes a drive line loop unit 51 and a drive line connection unit 52. The detection line selection section 60 includes a detection line loop unit 61 and a detection line connection unit 62. The control section controls the drive line selection Signed and Sealed this
Nineteenth Day of February, 2019

Andrei Iancu
*Director of the United States Patent and Trademark Office* section 50 and the detection line selection section 60 so as to put the drive lines and the detection lines into the looped state when the indicator is detected by an electromagnetic induction type, and the control section controls the drive line selection section 50 and the detection line selection section 60 so as to put the drive lines and the detection lines into the opened state or so as to put the drive lines into the looped state and the detection lines into the opened state when the indicator is detected by an electrostatic capacitance type.--

In the Specification

Column 2, Line 32 - Replace "that aye arranged" with --that are arranged--

Column 3, Line 45 - Replace "to foe interposed" with --to be interposed--

Column 4, Line 23 - Replace "control motion" with --control section--

Column 5, Line 11 - Replace "section 80" with --section 50--

Column 5, Line 53 - Replace "functions go as" with --functions so as--

Column 6, Line 18 - Replace "tour detection lines" with --four detection lines--

Column 7, Lines 34-35 - Replace "drive circuit 80" with --drive circuit 30--

Column 7, Line 49 - Replace "explaining m" with --explaining an--

Column 9, Line 64 - Replace "the silicone diode" with --the silicon diode--

Column 10, Line 20 - Replace "loop unit 81" with --loop unit 61--